US009862103B2

(12) United States Patent
Takebayashi et al.

(10) Patent No.: US 9,862,103 B2
(45) Date of Patent: Jan. 9, 2018

(54) END EFFECTOR, INDUSTRIAL ROBOT, AND OPERATION METHOD THEREOF

(71) Applicant: KAWASAKI JUKOGYO KABUSHIKI KAISHA, Kobe-shi, Hyogo (JP)

(72) Inventors: Jun Takebayashi, Kakogawa (JP); Shuhei Kuraoka, Akashi (JP); Hiroyuki Mizumoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/314,138

(22) PCT Filed: May 27, 2014

(86) PCT No.: PCT/JP2014/064010
§ 371 (c)(1),
(2) Date: Nov. 28, 2016

(87) PCT Pub. No.: WO2015/181896
PCT Pub. Date: Dec. 3, 2015

(65) Prior Publication Data
US 2017/0197318 A1  Jul. 13, 2017

(51) Int. Cl.
*B25J 15/04* (2006.01)
*B25J 15/06* (2006.01)
*B25J 15/08* (2006.01)

(52) U.S. Cl.
CPC .............. *B25J 15/04* (2013.01); *B25J 15/06* (2013.01); *B25J 15/08* (2013.01)

(58) Field of Classification Search
CPC ............. B25J 15/04; B25J 15/06; B25J 15/08
(Continued)

(56) References Cited

U.S. PATENT DOCUMENTS 3,881,763 A * 5/1975 Benson ................... B65B 21/12
                                                  279/37
4,621,853 A * 11/1986 Fink ..................... B25J 15/0206
                                                  294/116
(Continued)

FOREIGN PATENT DOCUMENTS

JP    S58-160090 A    9/1983
JP    S58-154088 U    10/1983
(Continued)

OTHER PUBLICATIONS

Aug. 19, 2014 International Search Report issued in International Patent Application No. PCT/JP2014/064010.
(Continued)

*Primary Examiner* — Paul T Chin
(74) *Attorney, Agent, or Firm* — Oliff PLC

(57) ABSTRACT

An end effector of the industrial robot has an end effector base portion connected to a robot arm, a first object holding mechanism provided to the end effector base portion so as to hold a first type of object to be handled, a second object holding unit for holding a second type of object to be handled, and a unit holding mechanism provided to the end effector base portion so as to releasably hold the second object holding unit. The second object holding unit which is held by the unit holding mechanism is driven by the first object holding mechanism. The end effector is capable of considerably enlarging a range of kind and size of an object which can be handled while suppressing increase of manufacturing cost and decline in credibility and increase in changing hand installation space accompanying complication of the configuration.

18 Claims, 7 Drawing Sheets

(58) Field of Classification Search
USPC ........... 294/2, 86.1, 86.4, 102.2, 119.1, 207; 901/30, 31, 32, 39
See application file for complete search history.

(56) References Cited

U.S. PATENT DOCUMENTS

| | | | | |
|---|---|---|---|---|
| 4,723,353 | A * | 2/1988 | Monforte | B25J 15/0052 414/737 |
| 6,494,516 | B1 * | 12/2002 | Bertini | B23P 19/084 294/119.1 |
| 6,530,578 | B1 * | 3/2003 | Svensson | B23B 31/18 279/106 |
| 7,654,788 | B2 * | 2/2010 | Rogalla | B25J 15/106 294/106 |
| 8,894,113 | B2 * | 11/2014 | Harada | B25J 15/00 294/2 |
| 2008/0101909 | A1 * | 5/2008 | Salimkhan | B25J 15/04 414/737 |
| 2011/0098859 | A1 * | 4/2011 | Irie | B25J 9/1687 700/259 |
| 2015/0028613 | A1 * | 1/2015 | Nakayama | B25J 15/0206 294/196 |

FOREIGN PATENT DOCUMENTS

| | | |
|---|---|---|
| JP | H07-227788 A | 8/1995 |
| JP | H09-254070 A | 9/1997 |
| JP | 2007-083339 A | 4/2007 |
| JP | 2007-316936 A | 12/2007 |
| JP | 2011-177862 A | 9/2011 |
| JP | 2013-091121 A | 5/2013 |
| JP | 2013-192365 A | 9/2013 |

OTHER PUBLICATIONS

Dec. 8, 2016 International Preliminary Report on Patentability issued in International Patent Application No. PCT/JP2014/064010.

* cited by examiner

END EFFECTOR, INDUSTRIAL ROBOT, AND OPERATION METHOD THEREOF

TECHNICAL FIELD

The present invention relates to an end effector, particularly an end effector for handling different kinds of objects to be handled, an industrial robot having the end effector, and an operation method of the industrial robot.

BACKGROUND ART

In the industrial robot, a suitable end effector (hand) corresponding to its work contents is mounted on a tip end of a robot arm and an object to be handled which is held by the end effector is transferred by driving the robot arm. In a production line for completing a product while assembling various kinds of objects to be handled (components) with different forms and dimensions, an industrial robot capable of corresponding to various kinds of objects to be handled is needed.

If a dedicated robot is to be arranged for each kind of object to be handled, a space needed to install the robots increases and a manufacturing cost for the robot also increases. Therefore, there is a request that one robot can correspond to different work contents and objects to be handled.

Therefore, industrial robots capable of automatically changing a hand which is mounted on a tip end of a robot arm as a whole or partially changing the configuration of the hand mounted on the tip end of the robot arm according to forms and dimensions of objects to be handled are proposed (Patent Documents 1, 2).

CITATION LIST

Patent Document

[Patent Document 1] Japanese Patent Application Laid-Open No. 2013-192365
[Patent Document 2] Japanese Patent Application Laid-Open No. 2011-177862

SUMMARY OF INVENTION

Objects to be Achieved by the Invention

However, the industrial robot capable of changing the configuration of the hand mounted on the tip end of the robot arm according to kinds and sizes of objects to be handled changes the configuration of the hand, and therefore requiring a complicated configuration, increasing a space for installing a hand to be changed, declining credibility due to the complicated configuration, and also increasing the cost.

The present invention is made considering the above-mentioned problems of the conventional technologies, and its object is to provide an end effector capable of considerably enlarging the range of kinds and sizes of objects to be handled which can be handled while suppressing the problems above, an industrial robot having the end effector, and a method for operating the industrial robot.

Means for Achieving the Objects

In order to achieve the objects above, a first aspect of the present invention is an end effector mounted on a robot arm of an industrial robot, comprising an end effector base portion connected to the robot arm, a first object holding mechanism provided to the end effector base portion so as to hold a first type of object to be handled, a second object holding unit for holding a second type of object to be handled, and a unit holding mechanism provided to the end effector base portion so as to releasably hold the second object holding unit, driving the second object holding unit which is held by the unit holding mechanism by the first object holding mechanism.

A second aspect of the present invention is that, in the first aspect of the invention, the first object holding mechanism has a first gripping member for gripping the first type of object to be handled, driving the second object holding unit which is held by the unit holding mechanism by the first gripping member.

A third aspect of the present invention is that, in the second aspect of the invention, the second object holding unit has a second gripping member for gripping the second type of object to be handled, driving the second gripping member of the second object holding unit which is held by the unit holding mechanism by the first gripping member.

A fourth aspect of the present invention is that, in a third aspect of the invention, the second object holding unit has an energizing means for energizing the second gripping member in a direction that the second type of object to be handled is gripped, driving the second gripping member in a direction that the second type of object to be handled is released by the first gripping member against an energizing force of the energizing means.

A fifth aspect of the present invention is that, in any one of the first to fourth aspects of the invention, the unit holding mechanism is provided to a center portion of the end effector base portion, the first object holding mechanism being provided around the unit holding mechanism.

An industrial robot according to a sixth aspect of the present invention comprises the end effector according to any one of the first to fifth aspects of the invention, and a robot arm on which the end effector is mounted.

A seventh aspect of the present invention is an operation method of the industrial robot according to the sixth aspect of the invention, comprising a step of holding the second object holding unit by the unit holding mechanism, a step of driving the second object holding unit by the first object holding mechanism so as to hold the second type of object to be handled by the second object holding unit, and a step of driving the robot arm so as to transfer the second type of object to be handled which is held by the second object holding unit.

An eight aspect of the present invention is an operation method of the industrial robot according to the sixth aspect of the invention, comprising a step of holding the second object holding unit by the unit holding mechanism, a step of driving the robot arm so as to transfer the second type of object to be handled which is held by the second object holding unit, and a step of driving the second object holding unit by the first object holding mechanism so as to release the second type of object to be handled which is held by the second object holding unit.

Advantageous Effect of the Invention

The present invention can provide an end effector capable of considerably enlarging a range of kind and size of an object which can be handled while suppressing increase of manufacturing cost, decline in credibility and increase in changing hand installation space accompanying complication of the configuration, an industrial robot comprising the end effector, and an operation method of the industrial robot.

EMBODIMENT OF THE INVENTION

Hereunder, an end effector 2 of an industrial robot 1 according to an embodiment of the present invention will be described referring to the figures.

Figure 1:
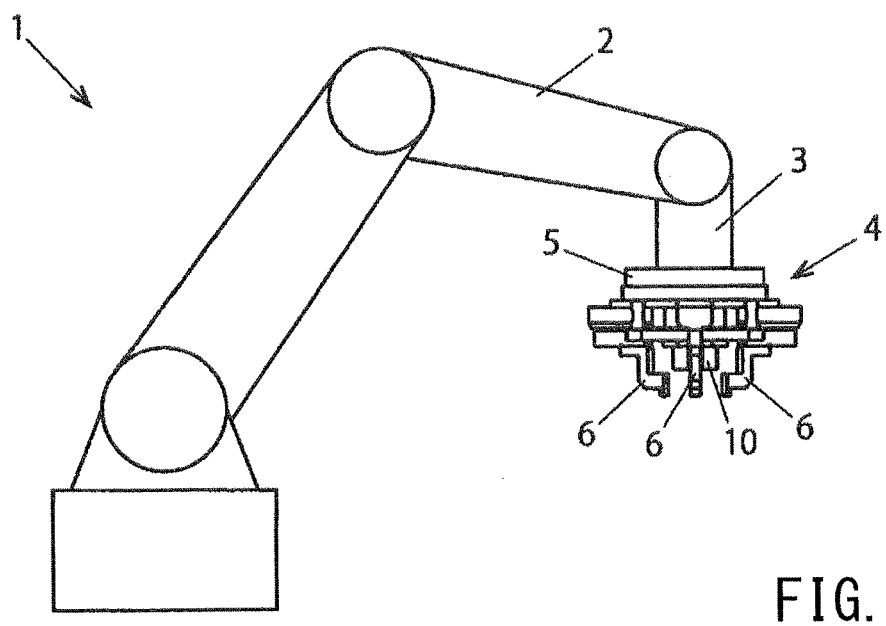
FIG. 1 is a side view illustrating a schematic configuration of an industrial robot on which an end effector according to an embodiment of the present invention is mounted (in a state that the second object holding unit is removed).

As illustrated in FIG. 1, the industrial robot 1 of the embodiment has an articulated robot arm 2 and an end effector (hand) 4 mounted on a wrist shaft 3 on a tip end of the robot arm.

Note that kinds of industrial robots to which the present invention is applied are not particularly limited and it can be applied to various kinds of industrial robots such as a vertical articulated robot, horizontal articulated robot, or the like.

Figure 2:
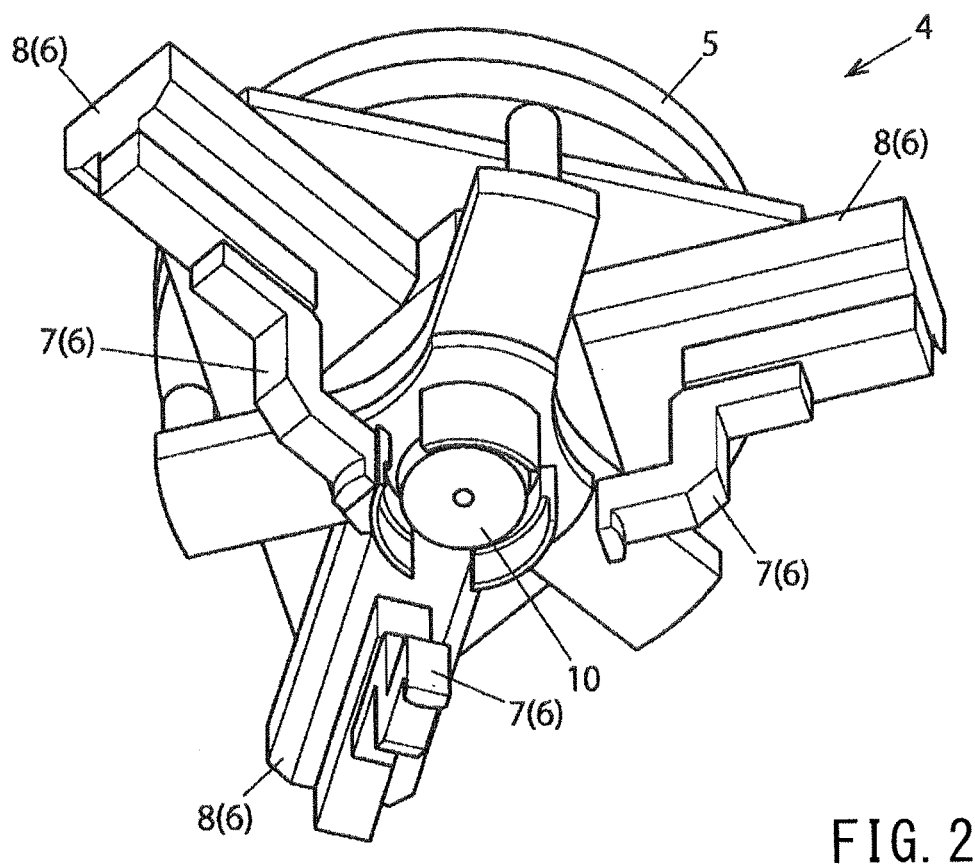
FIG. 2 is a perspective view from diagonally below illustrating the end effector of the industrial robot in FIG. 2 in a state that the second object holding unit is removed.
Figure 3:
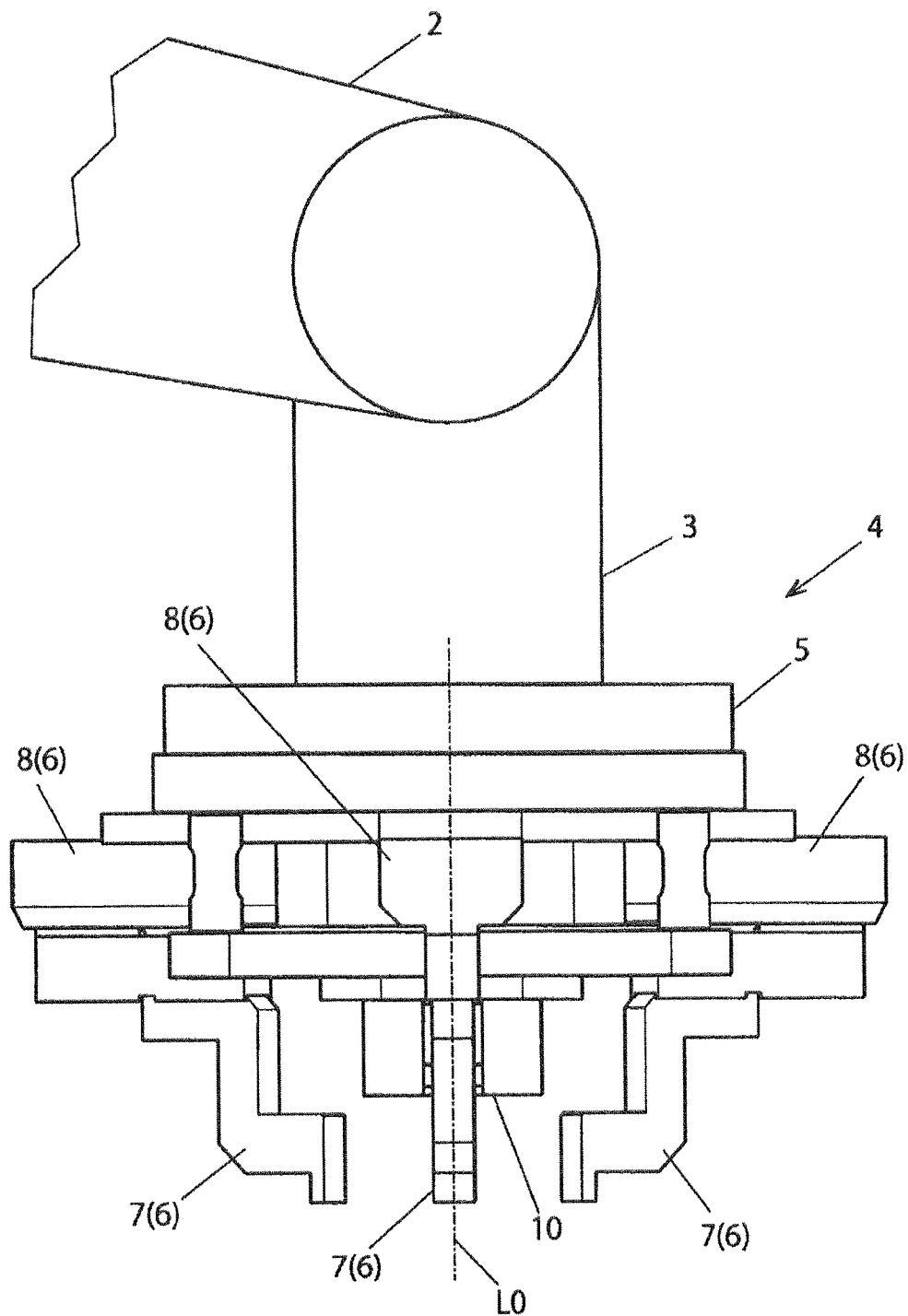
FIG. 3 is a front view illustrates the end effector in FIG. 2.
Figure 4:
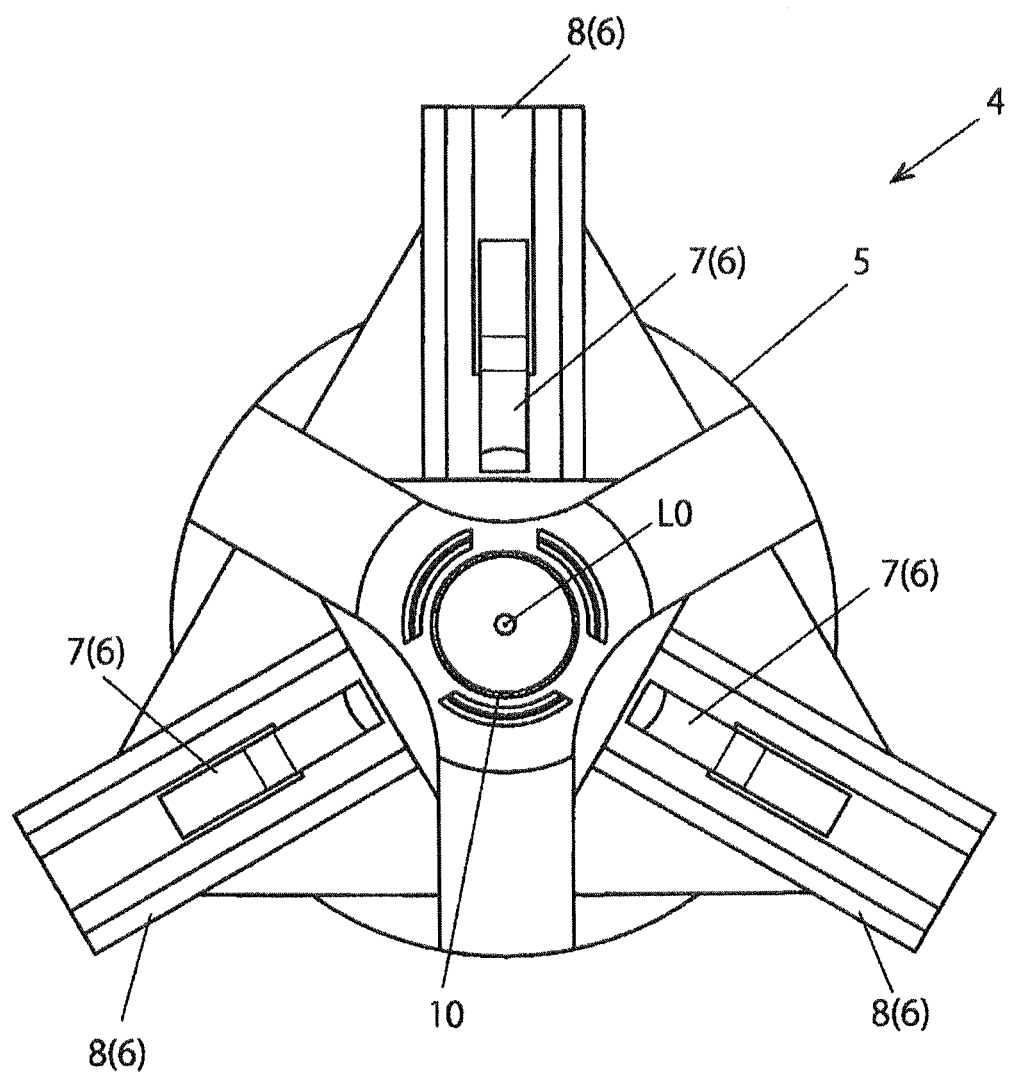
FIG. 4 is a bottom view of the end effector in FIG. 2.

As illustrated in FIGS. 2 to 4, the end effector 4 in the embodiment comprises an end effector base portion 5 connected to the robot arm 2 (FIG. 1). The end effector base portion 5 is provided with a first object holding mechanism 6 for holding a first type of object to be handled.

The first object holding mechanism 6 has a plurality of first gripping members 7 for gripping the first type of object to be handled, and a gripping member drive means 8 for driving the first gripping members 7.

In the embodiment, three first gripping members 7 are arranged at equal angular intervals (120°) around a center axis line L0 of the end effector 4. Each of the first gripping members 7 is driven back and forth in a radial direction with respect to the center axis line L0 of the end effector 4 by the gripping member drive means 8.

A type of the gripping member drive means 8 is not particularly limited, and various driving sources such as a fluid pressure cylinder such as an air cylinder or an electric drive source such as a servo motor can be used.

Figure 5:
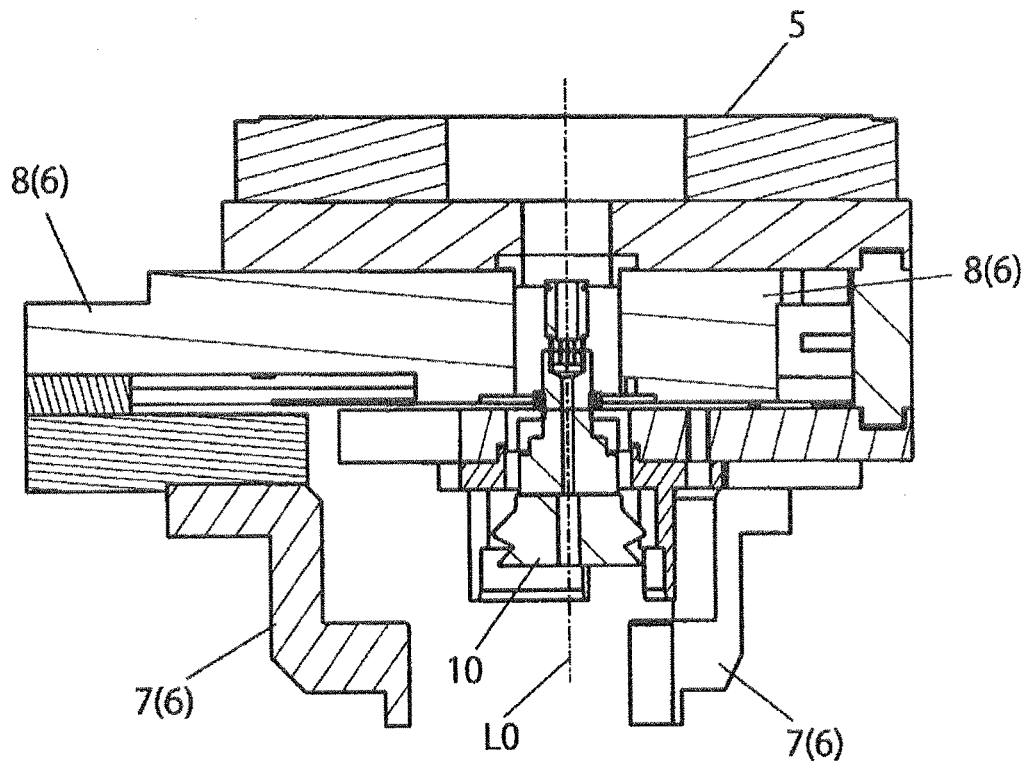
FIG. 5 is a longitudinal section view illustrating the end effector in FIG. 2 together with the first type of object to be handled.
Figure 5:
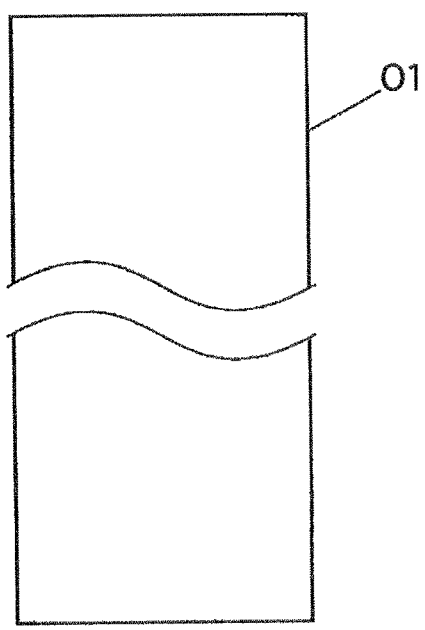

As illustrated in FIG. 5, when holding a first type of object to be handled O1 by the first object holding mechanism 6, each of the first gripping members 7 is positioned outside in the radial direction by the gripping member drive means 8 and the robot arm is driven so as to position the three first gripping members 7 around an upper end portion of the first type of object to be handled O1.

In the state, each of the first gripping members 7 is moved inside in the radial direction so as to grip the upper end portion of the first type of object to be handled O1 from three directions by each of the first gripping members 7. Subsequently, the robot arm 2 is driven so as to transfer the first type of object to be handled O1 to a predetermined transfer destination and each of the first gripping members 7 is moved outside in the radial direction by the gripping member drive means 8 so as to release the grip of the first type of object to be handled O1.

Figure 6:
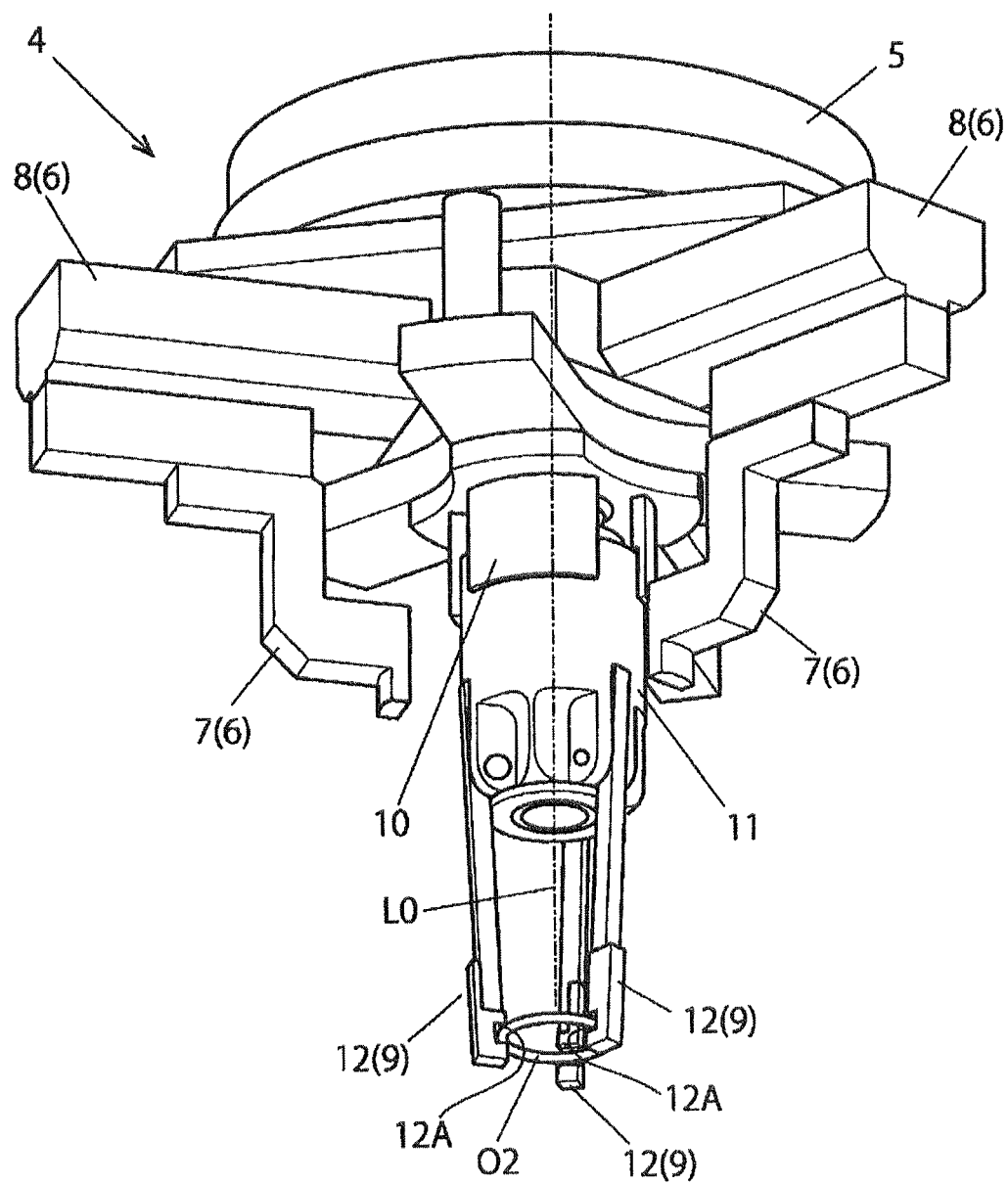
FIG. 6 is a perspective view illustrating a state that the second object holding unit is mounted on the end effector in FIG. 2 in a state that the second type of object to be handled is held.
Figure 7:
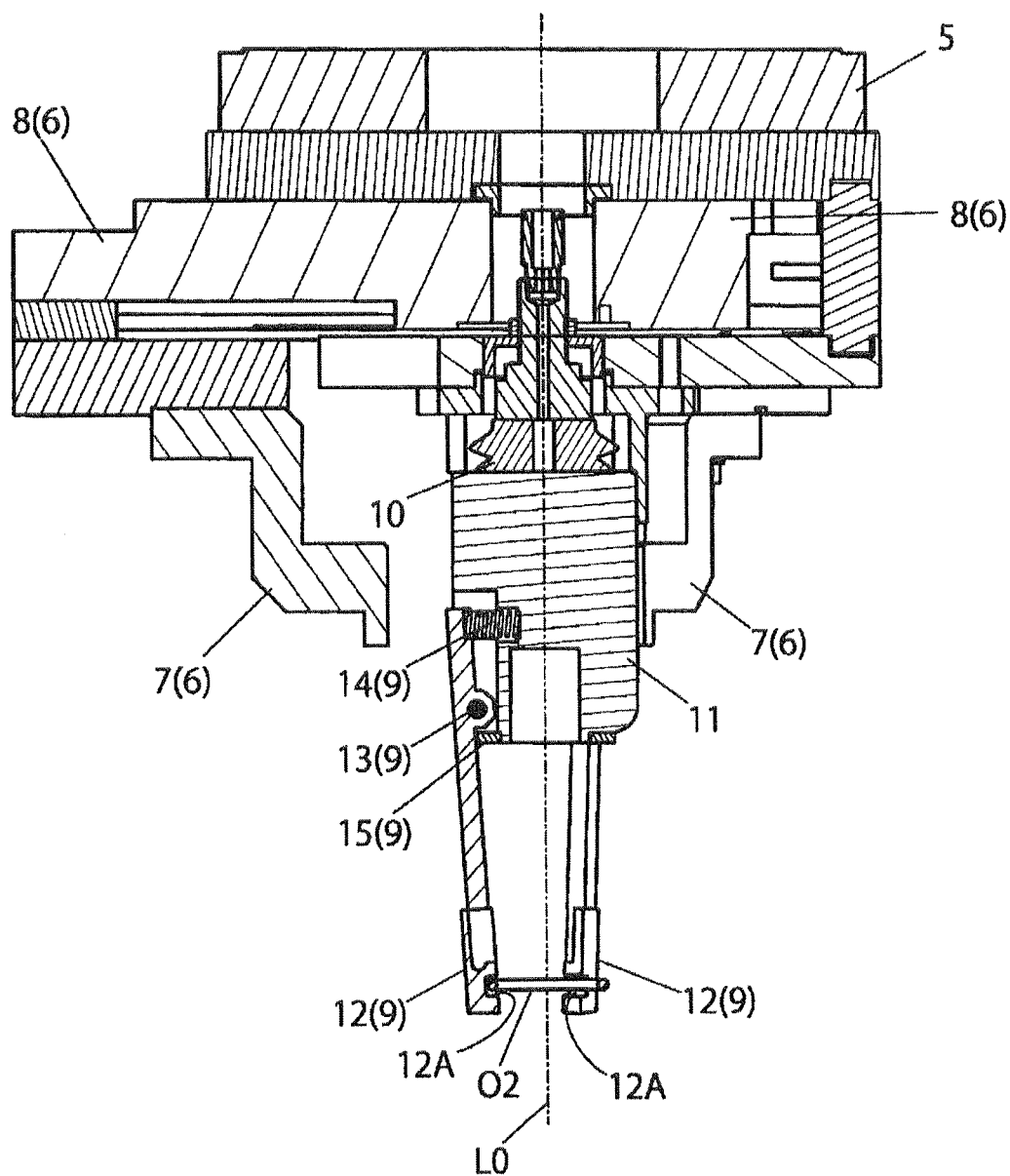
FIG. 7 is a longitudinal section view illustrating the end effector in FIG. 6 in a state that the second type of object to be handled is held.

As illustrated in FIGS. 6 and 7, a unit holding mechanism 10 for holding a second object holding unit 9 is provided at the center portion of the end effector base portion 5. The second object holding unit 9 is a unit for holding a second type of object to be handled O2. In the example, the unit holding mechanism 10 holds the second object holding unit 9 by adsorption.

However, a mechanism for the unit holding mechanism 10 to hold the second object holding unit 9 is not limited to adsorption and may be grip by a gripping member. That is, any mechanism will do as long as it can releasably fix the second object holding unit 9 to the end effector base portion 5.

Note that, in the embodiment, the second type of object to be handled O2 is smaller in diameter of a part to be held than the first type of object to be handled O1, and therefore the second type of object to be handled O2 cannot be held by the first gripping member 7 of the first object holding mechanism 6.

Namely, in the end effector of the embodiment, an object to be handled with a too small diameter to be held by the first object holding mechanism 6 can be held by the second object holding unit which is held by the unit holding mechanism 10.

Note that the second type of object to be held O2 in the embodiment is an O ring.

The second object holding unit 9 has a unit body 11 which is adsorbed and held by the unit holding mechanism 10 and a plurality of second gripping members 12 for gripping the second type of object to be handled O2. In the embodiment, three second gripping members 12 are arranged at equal angular intervals (120°) around a center axis line L0 of the end effector 5. A recessed portion 12 in which the O ring as the second type of object to be held D2 is fitted is formed at a tip end portion of each of the second gripping members 12.

As illustrated in FIG. 7, each of the second gripping members 12 is rockingly supported by a pivot pin 13 to the unit body 11 and also energized in a direction that the second type of object to be handled O2 is gripped (object gripping direction) by a compression spring (energizing means) 14. A rocking motion of the second gripping member 12 in the object gripping direction is restricted by each stopper member 15 provided inside in the radial direction with respect to each of the second gripping members 12.

The end effector according to the embodiment is configured so as to drive the second object holding unit 9 held by the unit holding mechanism 10 by the first object holding mechanism 6. More specifically, it is configured so as to drive the second gripping member 12 of the second object holding unit 9 held by the unit holding mechanism 10 by the first gripping member 7 of the first object holding mechanism 6.

Figure 8:
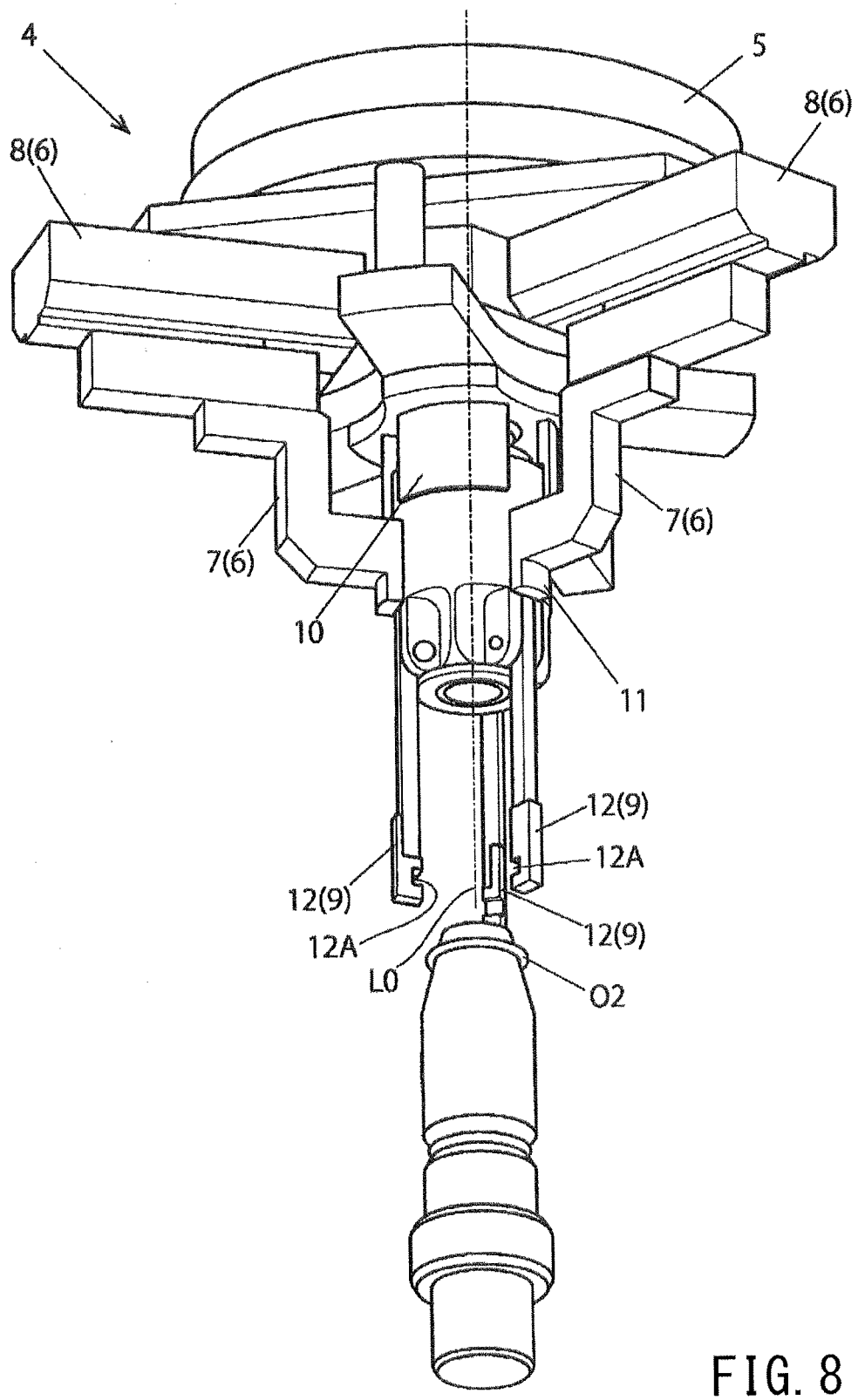
FIG. 8 is a perspective view illustrating a state that the second object holding unit of the end effector in FIG. 6 is driven so as to release the second object.

Namely, when the first gripping member 7 of the first object holding mechanism 6 is moved inside in the radial direction from the state illustrated in FIGS. 6 and 7, the upper end portion of the second gripping member 12 of the second object holding unit 9 is pushed in by a claw portion of the tip end of the first gripping member 6 against the energizing force of the compression spring 14, as illustrated in FIG. 8. Thereby, each of the second gripping members 12 is driven in a direction for releasing the second type of object to be handled O2.

The second type of object to be handled O2 (O ring in the embodiment) which has been released from the second gripping member 12 is fitted to a member which has been previously arranged therebelow as illustrated in FIG. 8, for example.

When holding the second type of object to be handled O2 by the second object holding unit 9 held by the unit holding mechanism 10, each of the second gripping members 12 is driven by each of the first gripping members 7 against the energizing force of each of the compression springs 14 so as to move each of the second gripping members 12 to a releasing position. In the state, the robot arm 2 is driven so as to position the three second gripping members 12 around the second type of object to be handled O2.

In the state, each of the first gripping members 7 is moved outside in the radial direction so as to move each of the second gripping members 12 to the object gripping direction by the energizing force of each of the compression springs 14. Thereby, the second type of object to be handled O2 is gripped from three directions by each of the second gripping members 12.

Subsequently, the second type of object to be handled O2 is transferred to a predetermined position by driving the robot arm 2 and each of the first gripping members 7 is moved inside in the radial direction so as to move each of the second gripping members 12 to the object releasing direction, releasing the gripping of the second type of object to be handled O2.

Note that, although the unit holding mechanism 10 is used for holding the second object holding unit 9 as mentioned above, it also can be used for holding the third type of object to be handled. The robot arm 2 is driven in the state that the third type of object to be handled is held by the unit holding mechanism so as to transfer the third type of object to be handled to a predetermined location.

As stated above, in the embodiment, the end effector base portion 5 is provided with the first object holding mechanism 6 and the unit holding mechanism 10, and also the second gripping member 12 of the second object holding unit 9 held by the unit holding mechanism 10 is driven by the first gripping member 7 of the first object holding mechanism 6. Therefore, it can considerably enlarge a range of kind and size of an object which can be handled while suppressing increase of manufacturing cost of the industrial robot 1, decline in credibility and increase in changing hand installation space accompanying complication of the configuration.

Also, the unit holding mechanism 10 for holding the second object holding unit 9 can be used for holding an object to be handled, and therefore the range of kind and size of an object which can be handled can be further enlarged.

DESCRIPTION OF REFERENCE NUMERALS

1 . . . industrial robot
2 . . . robot arm
3 . . . wrist arm
4 . . . end effector (hand)
5 . . . end effector base portion
6 . . . first object holding mechanism
7 . . . first gripping member
8 . . . gripping member drive means
9 . . . second object holding unit
10 . . . unit holding mechanism
11 . . . unit body
12 . . . second gripping member
12A . . . recessed portion of second gripping member
13 . . . pivot pin
14 . . . compression spring (energizing means)
15 . . . stopper member
O1 . . . first type of object to be handled
O2 . . . second type of object to be handled

The invention claimed is:

1. An end effector mounted on a robot arm of an industrial robot, comprising:
   an end effector base portion connected to the robot arm;
   a first object holding mechanism provided to the end effector base portion and configured to hold a first type of object to be handled;
   a second object holding unit configured to hold a second type of object to be handled; and
   a unit holding mechanism provided to the end effector base portion and configured to releasably hold the second object holding unit,
   wherein the second object holding unit which is held by the unit holding mechanism is driven by the first object holding mechanism.

2. The end effector according to claim 1, wherein the first object holding mechanism has a first gripping member configured to grip the first type of object to be handled, and
   wherein the second object holding unit which is held by the unit holding mechanism is driven by the first gripping member.

3. The end effector according to claim 2, wherein the second object holding unit has a second gripping member configured to grip the second type of object to be handled, and
   wherein the second gripping member of the second object holding unit which is held by the unit holding mechanism is driven by the first gripping member.

4. The end effector according to claim 2, wherein the unit holding mechanism is provided to a center portion of the end effector base portion, and
   wherein the first object holding mechanism is provided around the unit holding mechanism.

5. An industrial robot, comprising:
   the end effector according to claim 4, and
   a robot arm on which the end effector is mounted.

6. An industrial robot, comprising:
   the end effector according to claim 2, and
   a robot arm on which the end effector is mounted.

7. The end effector according to claim 3, wherein the second object holding unit has an energizing unit configured to energize the second gripping member in a direction that the second type of object to be handled is gripped, and
   wherein the second gripping member is driven in a direction that the second type of object to be handled is released by the first gripping member against an energizing force of the energizing unit.

8. The end effector according to claim 3, wherein the unit holding mechanism is provided to a center portion of the end effector base portion, and
   wherein the first object holding mechanism is provided around the unit holding mechanism.

9. An industrial robot, comprising:
   the end effector according to claim 8, and
   a robot arm on which the end effector is mounted.

10. An industrial robot, comprising:
the end effector according to claim 3, and
a robot arm on which the end effector is mounted.

11. The end effector according to claim 7, wherein the unit holding mechanism is provided to a center portion of the end effector base portion, and
wherein the first object holding mechanism is provided around the unit holding mechanism.

12. An industrial robot, comprising:
the end effector according to claim 11, and
a robot arm on which the end effector is mounted.

13. An industrial robot, comprising:
the end effector according to claim 7, and
a robot arm on which the end effector is mounted.

14. The end effector according to claim 1, wherein the unit holding mechanism is provided to a center portion of the end effector base portion, and
wherein the first object holding mechanism is provided around the unit holding mechanism.

15. An industrial robot, comprising:
the end effector according to claim 14, and
a robot arm on which the end effector is mounted.

16. An industrial robot, comprising:
the end effector according to claim 1, and
a robot arm on which the end effector is mounted.

17. An operation method of the industrial robot according to claim 16, comprising the steps of:
holding the second object holding unit by the unit holding mechanism;
driving the second object holding unit by the first object holding mechanism so as to hold the second type of object to be handled by the second object holding unit; and
driving the robot arm so as to transfer the second type of object to be handled which is held by the second object holding unit.

18. An operation method of the industrial robot according to claim 16, comprising the steps of:
holding the second object holding unit by the unit holding mechanism;
driving the robot arm so as to transfer the second type of object to be handled which is held by the second object holding unit; and
driving the second object holding unit by the first object holding mechanism so as to release the second type of object to be handled which is held by the second object holding unit.

* * * * *